United States Patent [19]
Glenn

[11] Patent Number: 5,303,043
[45] Date of Patent: Apr. 12, 1994

[54] PROJECTION TELEVISION DISPLAY UTILIZING BRAGG DIFFRACTION CELL FOR PRODUCING HORIZONTAL SCAN

[75] Inventor: William E. Glenn, Ft. Lauderdale, Fla.

[73] Assignee: Florida Atlantic University, Boca Raton, Fla.

[21] Appl. No.: 938,712

[22] Filed: Sep. 1, 1992

[51] Int. Cl.$^5$ .............................................. H04N 5/74
[52] U.S. Cl. ............................... 348/40; 359/9; 348/769
[58] Field of Search ............... 358/235, 231, 236, 160, 358/60, 90; 359/9, 10, 27, 29, 285, 305, 312, 11; H04N 5/74

[56] References Cited

U.S. PATENT DOCUMENTS

| | | | |
|---|---|---|---|
| 3,818,129 | 6/1974 | Yamamoto | 358/235 |
| 4,003,080 | 1/1977 | Maiman et al. | 358/231 |
| 4,577,932 | 3/1986 | Gelbart | 358/235 |
| 4,623,219 | 11/1986 | Trias | 358/236 |
| 4,851,918 | 7/1989 | Crowley | 358/235 |
| 5,172,251 | 12/1992 | Benton et al. | 359/9 |

OTHER PUBLICATIONS

E. Schildwachter, et al, "MTF Characteristics of the Scophony Scene Projector", 1991 Univ. of Central Florida.

J. R. Boyd, et al – "Design Procedure for Wide Bandwidth Acousto-Optic Modulator", Optical Engineering, vol. 16 No. 5, Sep./Oct. 1977, pp. 452–454.

Primary Examiner—James J. Groody
Assistant Examiner—Glenton B. Burgess
Attorney, Agent, or Firm—Brumbaugh, Graves, Donohue & Raymond

[57] ABSTRACT

Apparatus for horizontally scanning an image corresponding to electronic video input information utilizing a Bragg Diffraction cell in which collimated light from a laser directed through the cell is modulated by a real-time fourier transform of a line of video input information, thereby to produce a one line acoustic hologram in the cell which is reconstructed at a infinity as a stationary image corresponding to the horizontal line of video information. Using a suitable lens system, the stationary image is re-imaged at a plane positioned at a fixed distance from the Bragg Diffraction cell. The scanner is useful in image projection systems, in which the horizontal line image is vertically scanned by a galvanometer driven mirror vibrating in synchronism with the vertical blanking interval of the input video.

14 Claims, 2 Drawing Sheets

PROJECTION TELEVISION DISPLAY UTILIZING BRAGG DIFFRACTION CELL FOR PRODUCING HORIZONTAL SCAN

BACKGROUND OF THE INVENTION

This invention relates to image projection systems and, more particularly, to an improved laser scanner system for an image projector useful for large screen display of electronic video information, such as high definition television.

A known scanning scene projector, in which the scene is painted onto the image plane using a high intensity light source, is the Scophony scanner developed at the Scophony Laboratories outside London during the 1930's, wherein an amplitude modulated video signal is modulated onto a collimated beam of light in an acousto-optic cell; the collimated beam fills a large portion of the acousto-optic aperture. The acousto-optic cell produces Bragg diffraction from the phase grating caused by spatially periodic variations of refractive index. By spreading the beam across the acousto-optic aperture, several "points" of the image are simultaneously modulated. This fan of information is scanned in the horizontal direction and imaged in the real image plane; because the image moves at the speed of sound in the acousto-optic cell, in order to view the scene an offsetting motion is provided to make the information stationary in the image plane. This is achieved in the Scophony system by a lens following the acousto-optic cell which produces a fourier transform plane at the plane of a multifaceted spinner rotating in the opposite direction so that even if the acoustic image is moving at the speed of sound, the offsetting motions freeze the image in space.

While the Scophony type of scanner, using a gas laser as the source of light, has adequate resolution for high definition projectors and has been produced commercially in the United States, Japan and Great Britain, it has not enjoyed wide acceptance for two reasons: (1) the low electrical-to-optical efficiency and high cost of gas lasers, and (2) the complexity and high cost of manufacturing and assembling the rotating multifaceted polygonal spinner.

Accordingly, a primary object of the present invention is to provide an improved image projection system.

A more specific object of the invention is to provide a laser scanner for an image projection system which does not require the use of a multifaceted polygonal spinner for stabilizing the image.

Another object is to provide, at a cost lower than for prior art scanners, a scanner capable of producing colored high resolution images.

SUMMARY OF THE INVENTION

Briefly, the problem of high cost, low efficiency gas lasers is overcome by the use of solid-state lasers, which are now, or soon will be, available in all three primary colors. Collimated light from a solid-state laser is directed through an acousto-optical cell modulated by the fourier transform of a line of video, rather than by the video itself as in the Scophony system, which will reconstruct a one line image in the fourier transform plane of the optical system. The fourier transform of a line of video applied to the cell produces a one line acoustic hologram in the cell which, by virtue of the collimated light passing through the cell, is reconstructed at infinity, and even though the acoustic hologram is moving at the speed of sound the image is stationary, thus eliminating the need for a spinner.

Vertical scan for the imaging system is produced by a galvanometer-driven mirror vibrating in synchronism with the vertical blanking interval generated by the video source.

For a color display, three solid-state lasers, one for each primary color, are used, each with a respective acousto-optic modulator. The line length in the real image plane is the same for all three colors and is adjusted either by choice of the frequency range of the fourier transform or by changing the focal length of the lens between the acousto-optic cell and the real image plane.

BRIEF DESCRIPTION OF THE DRAWINGS

Other objects, features and advantages of the invention will become apparent, and its construction and operation better understood, from the following detailed description, read in conjunction with the accompanying drawings, in which.

DESCRIPTION OF THE PREFERRED EMBODIMENT

Figure 1:
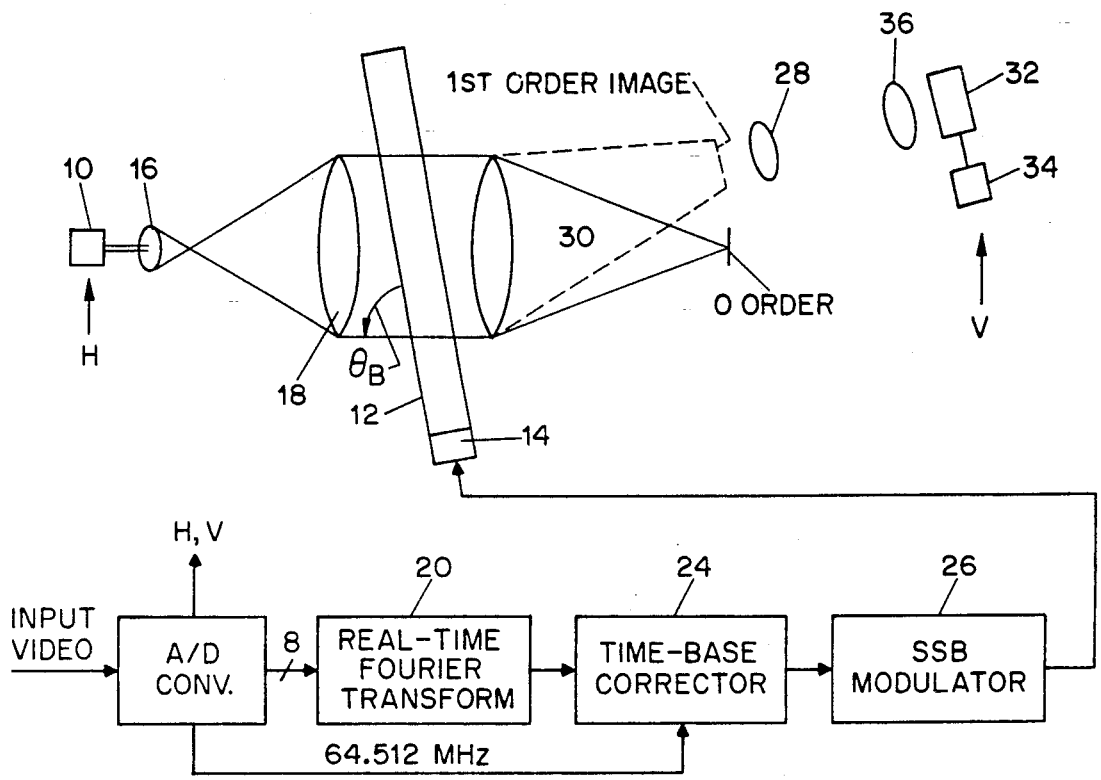
FIG. 1 is a diagram schematically illustrating a laser scanner constructed according to the invention.
Figure 2:
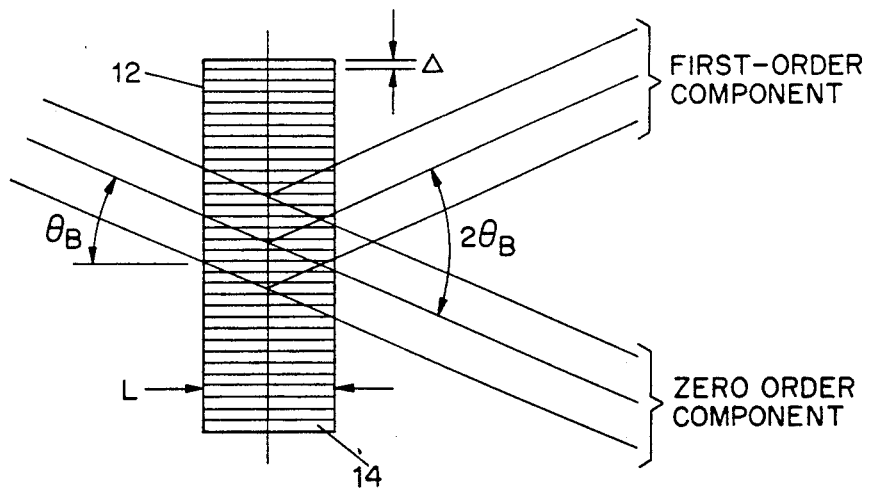
FIG. 2 is a diagram illustrating the Bragg diffraction configuration.

The image projector according to the invention, schematically illustrated in FIG. 1, performs a two-dimensional raster scan of the beam of a solid-state laser 10 that is directed through and intensity modulated by an acousto-optic cell 12 in response to an amplitude modulated video signal which drives the cell via an associated piezo-electric transducer 14. The cell 12 preferably is a high efficiency Bragg diffraction cell commercially available from a number of sources, including Harris Corporation, Melbourne, Fla. The laser beam is greatly expanded with a beam expander lens 16, and the expanded beam is directed onto a collimating lens 18 which directs a large area collimated light beam onto the aperture of cell 12. The cell 12 is tilted relative to the plane of collimating lens 18 by the Bragg angle $\theta_B$, so that light entering the cell exits in either the zero or first diffracted order. This relationship is more apparent in FIG. 2 where it is seen that light entering the A-O cell 12 at the Bragg angle $\theta_B$ exits in either the zeroth or the first diffracted order. The Bragg angle is defined as $$\theta_B = \sin^{-1}\left[\frac{\lambda f}{2v}\right], \quad (1)$$

where $\lambda$ is the wavelength of the radiation in air, f is the acoustic frequency and v is the velocity of sound in the material of the A-O cell. $\Lambda = v/f$ is the spatial grating period of the acoustic wave inside the cell, and the spatial frequency, $\xi$, of the phase grating is the inverse of $\Lambda$, namely, $$\xi = \frac{f}{v}. \quad (2)$$

By inclining the input beam to cell 12 by the Bragg diffraction angle, almost all of the energy will be diffracted into the first order, on one side of the central (zero order) beam. The efficiency of Bragg diffraction cells can be quite high, approximately 80%, under ideal conditions, but as a practical matter an efficiency on the order of 50% is more likely.

In accordance with an important aspect of the invention, the A-O cell 12 is driven by a fourier transform of one line of video, not the video itself, and to this end, the video input signal is applied to a digital real-time fourier transform processor 20. More particularly, the input video is applied to an analog-to-digital converter 22 which produces as an output an 8-bit data word that represents a sample of the video horizontal line, taken at 9.6 MHz clock intervals (assuming an NTSC 525-line system), and also appropriate control signals, including a vertical blanking signal which identifies the start of each field, and a further clock signal having a frequency four times higher than the 16.128 MHz frequency of the system clock, or 64.512 MHz, for synchronizing time base correction. The digital output of the A/D converter is applied to a fast fourier transform digital processor 20, such as the TMC 2310 fast fourier transform digital processor module developed and produced by TRW. The processor produces a fast fourier transform of one horizontal line of an NTSC video signal at a time, and this transform is utilized to produce the horizontal image by Bragg diffraction.

The output of processor 20 is a set of frequencies each of which is proportional to the position of a point on the horizontal line being processed, and the amplitude of which is proportional to the intensity of the associated point. Basically, the circuit produces the same pattern that a one-line hologram would have except that the transformation is from position to frequency as a time sequence and is performed with a digital circuit. Because acousto-optic cells are only good for a frequency range of about an octave, and the range of frequencies of the fourier transform is in a range from zero to some finite frequency, it is necessary to limit the frequency of the signal applied to the cell 12. In order to obtain reasonable frequencies for application to the A-O cell, the transform produced by processor 20 is time-base-corrected to occupy one-quarter of the time that is occupied before correction. Under control of the 64.512 MHz clock, a time-base corrector 24 clocks the transform out of processor 20 during a period which corresponds to one-quarter of the horizontal line interval and repeats the process four times, such that the transform after correction takes up the whole horizontal line interval, with the same set of frequencies distributed over a longer period of time. By this process the frequencies are made higher which, in turn, causes the A-O to exhibit larger diffraction angles and to produce an image of acceptable size when using a low power solid-state laser. Assuming for example, 10 MHz of input video, the described time-base correction process increases the frequency to 40 MHz, which because of being repeated four times still occupies the same one horizontal line interval.

This signal outputted by time-base corrector 24 is modulated onto the carrier of a single sideband modulator 26, which for a 525-line system would have a carrier frequency of 80.64 MHz, whereby the sideband goes from about 40 MHz to 80.64 MHz, approximately a factor of two, thereby satisfying the one-octave criteria discussed above. The sideband signal outputted by modulator 26 is applied to piezoelectric transducer 14 which in well-known fashion intensity modulates the cell to produce a one-line phase hologram. By virtue of the described signal processing, the aperture of the cell is sufficiently large that a pixel in the original image will be resolved in a spot where the diffraction-limited size of the spot is a quarter of a pixel—an extremely high resolution. The offsetting of the fourier transform of the video provides the further advantage that the second order of the transform does not fall within the line being displayed.

The transform is launched for one active line interval, in synchronism with the pulsing of laser 10, which is turned on for the horizontal blanking interval. Even though the transform is moving at the speed of sound in the cell material, for the duration of the blanking interval the real image of the line reconstructed at infinity will be stationary. A lens 30 positioned to intercept the modulated light beam exiting from A-O cell 12 re-images this stationary image onto a field lens 28 positioned at a fixed distance from the diffraction cell. This image, consisting of successive horizontal scan lines, is scanned vertically by a mirror 32 driven by a galvanometer 34 to vibrate in synchronism with the vertical blanking interval of the input video signal, and projected through a projector lens 36 onto a viewing screen (not shown). Galvanometer-driven mirrors are rather standard components in laser scanners and are commercially available at reasonable cost.

Figure 3:
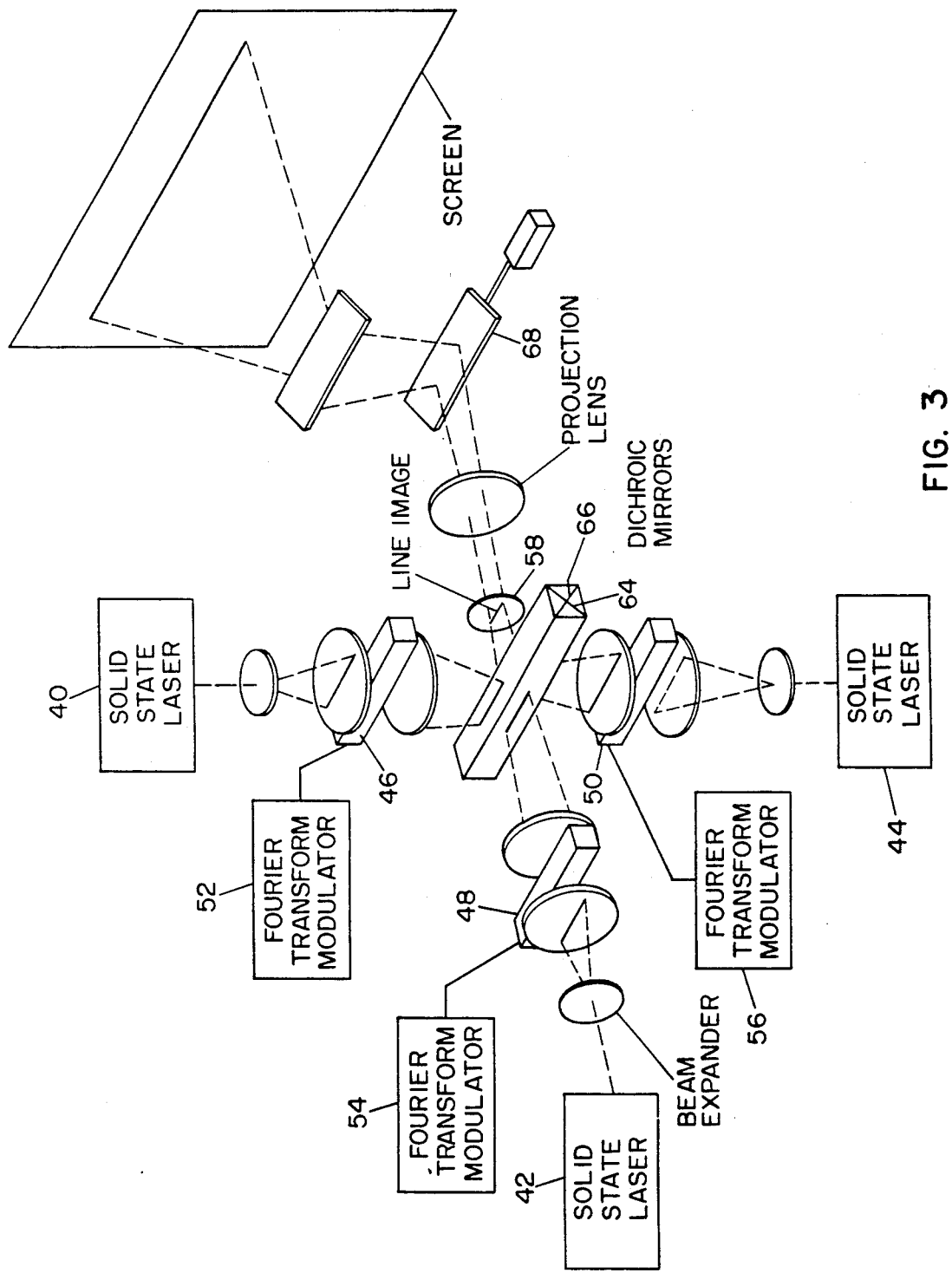
FIG. 3 is a diagram schematically illustrating a three-color image projection system embodying the laser scanner of the invention.

For a color display, schematically illustrated in FIG. 3, three solid state lasers 40, 42 and 44, one for each primary color, are used, each with a respective acousto-optic modulator 46, 48 and 50, each driven by a respective fast fourier transform module 52, 54 and 56. The three different-colored images re-imaged on the field lens 58 are combined with two dichroic mirrors 64 and 6 and directed onto a single galvanometer driven mirror 68 which vertically scans the horizontal array of colored lines. The line length in the real image plane is made the same for all three colors either by selection of the frequency range of the three fourier transforms, or by choice of focal lengths of the lenses positioned between respective A-O cells and the real image plane common to all.

While specific embodiments of the invention have been illustrated and described, it will be appreciated that many modifications and changes can be made without departing from the spirit of the invention. For example, when the system is used to project television images in a 1050-line system, the single side band modulator 26 would have to have a center frequency of 80 MHz and a bandwidth of 50 MHz, instead of the values specified for a 525-line system. It is intended, therefore, by the following claims to cover all such modifications and changes as fall within the true spirit and scope of the invention.

I claim:

1. A video imaging system responsive to electronic signals representing a video image, said system comprising, in combination:
    an acoustic-optic modulator comprising a Bragg Diffraction cell having an aperture for generating a diffraction grating which diffracts light at a Bragg diffraction angle;
    a laser light source for providing a beam of light signals that pass along a beam axis through the aperture of said cell and through the diffraction grating generated in said modulator;

means coupled to said modulator for converting said electronic input information, one horizontal line at a time, into a real time fourier transform for producing inside said modulator a diffraction grating which modulates light signals from said laser source passing therethrough to generate modulated light signals that reconstruct at infinity as a stationary image corresponding to said one horizontal line of said video input information; and a lens positioned to intercept modulated light signals exiting from said modulator for re-imaging said stationary image at a plane positioned at a distance from said modulator corresponding to the focal length of said lens.

2. System as defined in claim 1, wherein said Bragg Diffraction cell is tilted relative to the beam axis of said beam of light signals by said Bragg angle for causing light signals entering the cell to exit the cell in either zero or first diffracted order.

3. System as defined in claim 1, wherein said laser light source is a solid state laser.

4. System as defined in claim 2, wherein said laser light source is a solid state laser.

5. System as defined in claim 1, wherein said means coupled to said modulator comprises:

analog-to-digital converter means for converting said video input information to a digital signal at clock intervals proportional to the horizontal line rate of said video input information, digital processor means for receiving said digital signal and producing a real-time fourier transform of said digital signal, time-base correcting means for increasing by a predetermined factor the frequencies contained in said fourier transform and producing a time-base-corrected output signal onto a carrier signal and for coupling the modulated carrier signal to said modulator.

6. Apparatus as defined in claim 5, wherein said means for modulating is a single sideband modulator having a carrier frequency so related to the frequencies contained in said time-based-corrected output signal that the sideband frequencies encompass approximately an octave, and wherein the sideband of said modulator is coupled to said modulator.

7. Method for horizontally scanning an image corresponding to a horizontal line of electronic video input information, comprising the steps of:

(a) directing a beam of coherent light signals along a beam axis through the aperture of a Bragg Diffraction cell;

(b) coupling to said Bragg Diffraction cell a real time fourier transform of a horizontal line of said video information for producing inside said cell a one line acoustic hologram which modulates said light signals to generate modulated light signals that reconstruct at infinity as a stationary image of said horizontal line of video information; and (c) re-imaging said stationary image at a plane positioned a fixed distance from the Bragg Diffraction cell.

8. The method defined in claim 7, wherein in step (a) the beam axis of said beam of coherent light signals is directed at a predetermined angle relative to the axis of the cell for causing light signals passing through the cell to exit in either a zero or first diffracted order.

9. A video imaging system responsive to electrical signals representing a video image comprising, in combination:

a pulsed laser for providing an input light beam;

an acoustic-optic modulator;

circuit means coupled to said modulator for producing inside said modulator an acoustic hologram corresponding to a real-time fourier transform of a horizontal line of said video image at clock intervals proportional to the horizontal line rate of said video image;

a first lens for directing a light pulse from said laser onto said acoustic hologram inside said modulator;

means for synchronizing said light pulse with an active line interval of said fourier transform, said modulator diffracting light from said laser and reconstructing said acoustic hologram at infinity as a stationary real image of said horizontal line of said video image; and a second lens positioned in the diffracted output beam of said modulator for re-imaging said stationary real image in a plane located at a finite distance from said modulator.

10. System as defined in claim 9, wherein said laser is a solid state laser.

11. System as defined in claim 9, wherein said means coupled to said modulator comprises:

means for converting electrical signals representing a horizontal line of said video image to a digital signal at clock intervals proportional to the horizontal line rate of said input video information;

digital processor means for producing a real-time fourier transform of said digital signal; and means for modulating a carrier signal with said real-time fourier transform of said digital signal and applying the modulated carrier signal to said modulator.

12. System as defined in claim 9, wherein said means coupled to said modulator comprises:

means for converting electrical signals representing a horizontal line of said video image to a digital signal at clock intervals proportional to the horizontal line rate of said input video information;

digital processor means for producing a real-time fourier transform of said digital signal;

time-base-correcting means for increasing by a predetermined factor the frequencies contained in said real-time fourier transform and producing a time-base-corrected output signal; and means for modulating a carrier signal with said time-base-corrected output signal and applying the modulated carrier signal to said modulator.

13. System as defined in claim 9, wherein said apparatus further comprises:

means including a mirror for vertically scanning said re-imaged horizontal line in synchronism with the vertical blanking interval of said input video information.

14. System as defined in claim 9, which includes:

three separate pulsed laser to provide three separate input light beams of red, green and blue, respectively;

three separate acoustic-optic modulators each arranged to receive light pulses from a respective pulsed laser;

three separate circuit means each for producing inside a respective modulator an acoustic hologram corresponding to a real-time fourier transform corresponding to the same horizontal line of said video image at clock intervals proportional to the horizontal line rate of said video image;

means for synchronizing the light pulses from all three lasers with an active line interval of said fourier transform, said modulators each diffracting light from a respective laser and reconstructing said acoustic hologram as a separate stationary real image of said horizontal line of said video image;

means including said second lens for re-imaging said separate stationary real images to produce a full color line image positioned in a plane located at a finite distance from said modulator; and a third lens for directing said full color line image onto a oscillatory mirror for vertically scanning said full color line image in synchronism with the vertical blanking interval of said video image.

* * * * *